US007675258B2

(12) United States Patent
Dattilo et al.

(10) Patent No.: US 7,675,258 B2
(45) Date of Patent: Mar. 9, 2010

(54) OPERATOR-CONTROL DEVICE FOR A MACHINE

(75) Inventors: James Donald Dattilo, Metamora, IL (US); Shawn Ivor Cullen, Peoria, IL (US); Paul Robert Erickson, Prior Lake, MN (US); Joshua Bernard Durand, Buffalo, MN (US)

(73) Assignee: Caterpillar Inc., Peoria, IL (US)

( * ) Notice: Subject to any disclaimer, the term of this patent is extended or adjusted under 35 U.S.C. 154(b) by 268 days.

(21) Appl. No.: 11/730,366

(22) Filed: Mar. 30, 2007

(65) Prior Publication Data

US 2008/0238352 A1 Oct. 2, 2008

(51) Int. Cl.
*B25J 9/18* (2006.01)

(52) U.S. Cl. .................. 318/568.11; 318/560; 318/567; 318/575

(58) Field of Classification Search ............ 318/568.11, 318/560, 567, 575, 568.16, 568.21, 568.1, 318/610; 901/2, 4; 364/424.01
See application file for complete search history.

(56) References Cited

U.S. PATENT DOCUMENTS

| | | | | |
|---|---|---|---|---|
| 4,800,721 | A | 1/1989 | Cemenska et al. | |
| 5,019,761 | A | 5/1991 | Kraft | |
| 5,223,072 | A * | 6/1993 | Brockman et al. | 242/420.6 |
| 5,436,640 | A | 7/1995 | Reeves | |
| 6,202,501 | B1 | 3/2001 | Ikari | |
| 6,373,465 | B2 | 4/2002 | Jolly et al. | |
| 6,505,703 | B2 | 1/2003 | Stout et al. | |
| 6,512,509 | B1 | 1/2003 | McVicar | |
| 6,573,885 | B1 | 6/2003 | McVicar | |
| 6,679,809 | B2 | 1/2004 | Kato et al. | |
| 6,694,236 | B2 | 2/2004 | Onodera | |
| 6,756,967 | B2 | 6/2004 | Onodera et al. | |
| 6,836,982 | B1 | 1/2005 | Augustine | |
| 6,857,490 | B2 | 2/2005 | Quigg | |
| 6,917,867 | B2 | 7/2005 | Huang et al. | |
| 6,948,582 | B2 | 9/2005 | Shiomi et al. | |
| 7,059,680 | B2 | 6/2006 | Billger et al. | |
| 7,086,292 | B2 | 8/2006 | Onodera | |
| 7,100,467 | B2 | 9/2006 | Shiomi et al. | |
| 7,137,475 | B2 | 11/2006 | Shiomi et al. | |
| 2003/0090460 | A1 | 5/2003 | Schena et al. | |

FOREIGN PATENT DOCUMENTS

| | | |
|---|---|---|
| EP | 0 384 806 | 8/1990 |
| EP | 1 316 491 | 6/2003 |
| GB | 2 412 421 | 9/2005 |
| WO | WO 88/06242 | 8/1988 |

* cited by examiner

*Primary Examiner*—Karen Masih
(74) *Attorney, Agent, or Firm*—Finnegan, Henderson, Farabow, Garrett & Dunner

(57) ABSTRACT

A machine includes an operator seat and an armrest adjacent the operator seat. The machine may also include a control system, which may include a control handle extending at least partially upward from the armrest. The control system may also include a force feedback device drivingly connected to the control handle and operable to supply feedback force to the control handle. The force-feedback device may include at least one of an actuator or a brake. Additionally, the control system may automatically adjust the magnitude of the feedback force supplied to the control handle by the force feedback device in at least some circumstances.

20 Claims, 6 Drawing Sheets

OPERATOR-CONTROL DEVICE FOR A MACHINE

TECHNICAL FIELD

The present disclosure relates to operator controls for machines and, more particularly, to operator-control devices that include control handles.

BACKGROUND

Many machines include an operator-control device with one or more control handles that an operator can manipulate to provide input to a control system of the machine. For example, U.S. Pat. No. 7,059,680 B2 to Billger et al. ("the '680 patent") discloses a machine with operator-control devices positioned on each armrest of an operator seat of the machine. The '680 patent discloses that the operator controls of the machine include a traction-control arm positioned on one armrest for controlling propulsion of the machine. On the other armrest of the operator seat, the machine of the '680 patent includes a steering tiller for steering the machine.

Unfortunately, the machine disclosed by the '680 patent may have certain disadvantages. For example, the '680 patent does not disclose any provisions for varying the resistance an operator feels when manipulating the traction-control arm or the steering tiller based on operating conditions of the machine. An operator cannot glean information about the operation of the machine from the resistance presented by the traction-control arm and the resistance presented by the steering tiller if they do not vary dependent on operating conditions. Accordingly, connecting a force feedback device to the traction control arm and/or to connecting a force feedback device to the steering tiller to provide an operator with feedback force could help the operator control the machine more effectively. Unfortunately, connecting a force feedback device to a control handle mounted on an armrest has previously proven difficult.

The operator-control device and methods of the present disclosure solve one or more of the problems set forth above.

SUMMARY OF THE INVENTION

One disclosed embodiment relates to a machine that includes an operator seat and an armrest adjacent the operator seat. The machine may also include a control system, which may include a control handle extending at least partially upward from the armrest. The control system may also include a force feedback device drivingly connected to the control handle and operable to supply feedback force to the control handle. The force-feedback device may include at least one of an actuator or a brake. Additionally, the control system may automatically adjust the magnitude of the feedback force supplied to the control handle by the force feedback device in at least some circumstances.

Another embodiment relates to a method of operating a machine. The machine may have an operator seat, an armrest adjacent the operator seat, and a control system. The method may comprise supporting a handle of the control system with the handle extending at least partially upward from the armrest. The method may also include generating an electrical signal related to one or more aspects of the motion of the control handle and supplying the electrical signal to one or more components of the control system. Additionally, the method may include supplying feedback force to the control handle with a force-feedback device, which may include adjusting the magnitude of the feedback force based on one or more operating conditions of the machine.

A further embodiment relates to a machine that includes an operator seat, a floor adjacent the operator seat, and an armrest adjacent the operator seat. The machine may also include a control system, which may include a control handle extending at least partially upward from the armrest. The control system may also include a force-feedback device disposed above the floor, the force-feedback device being drivingly connected to the control handle and operable to supply feedback force to the control handle. Additionally, the control system may automatically adjust the magnitude of feedback force supplied to the control handle by the force-feedback device in at least some circumstances.

DETAILED DESCRIPTION

Figure 1A:
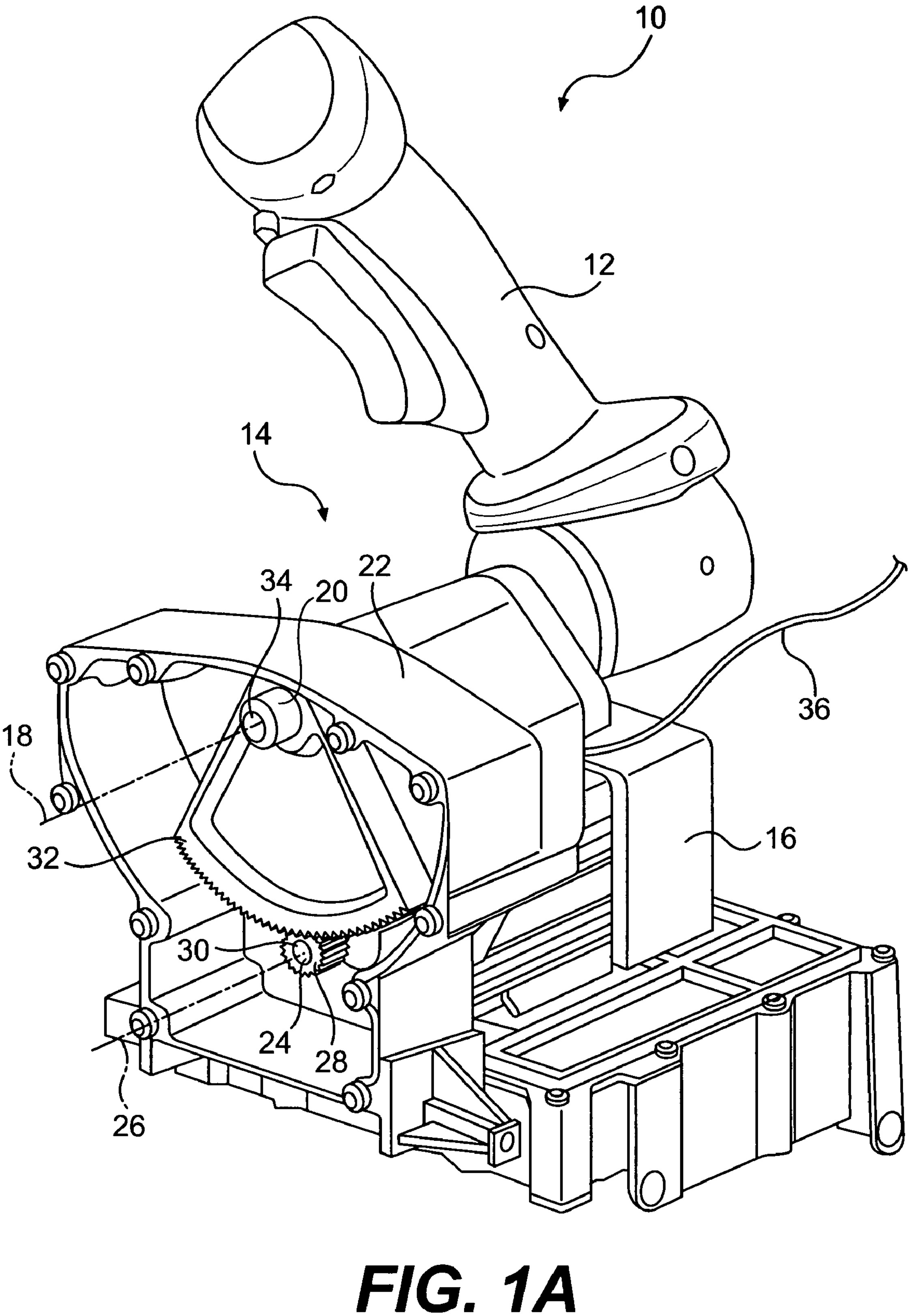
FIG. 1A is a perspective view of one embodiment of an operator-control device according to the present disclosure.
Figure 1B:
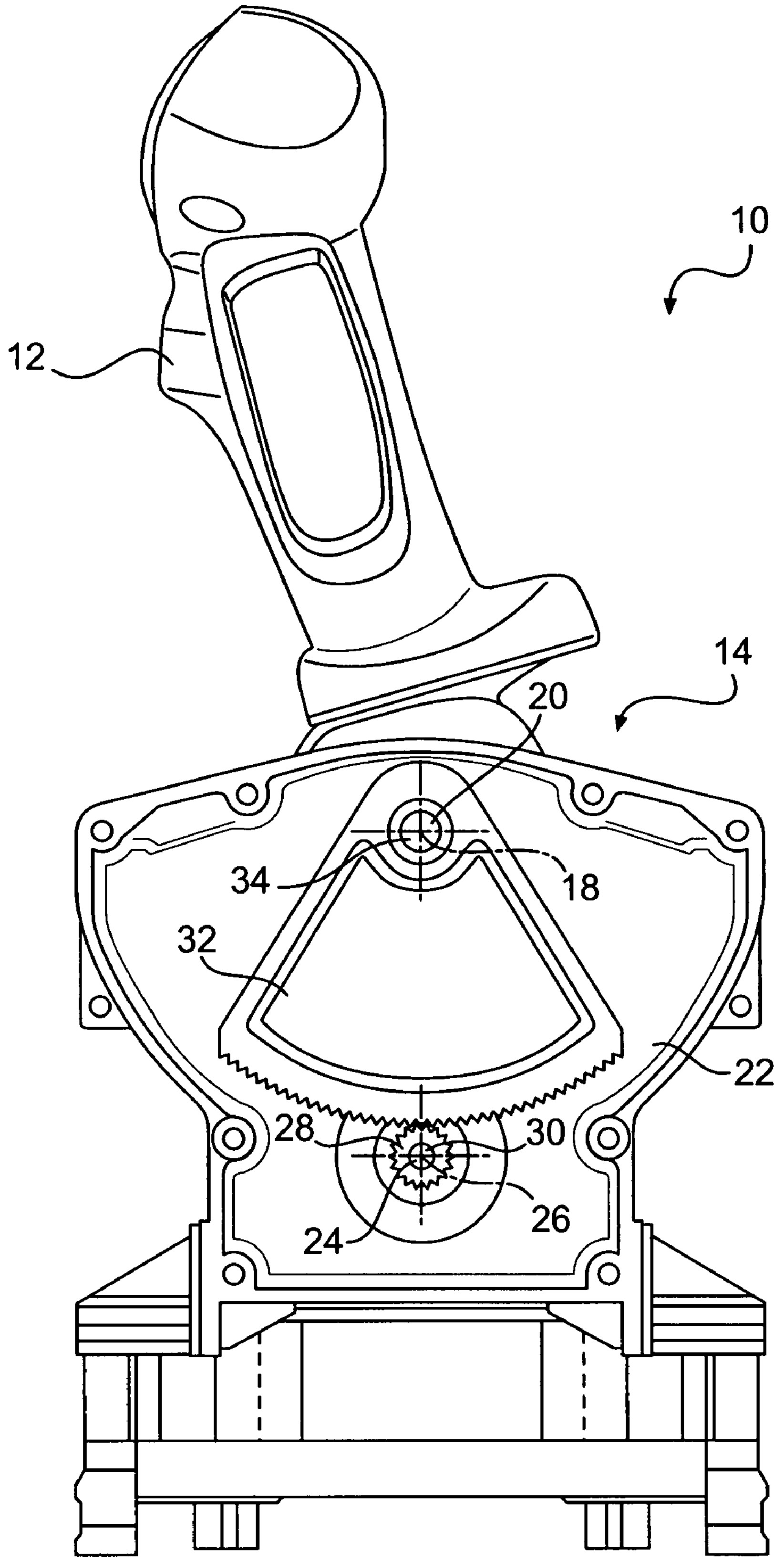
FIG. 1B is another view of the operator-control device according to the present disclosure.
Figure 1C:
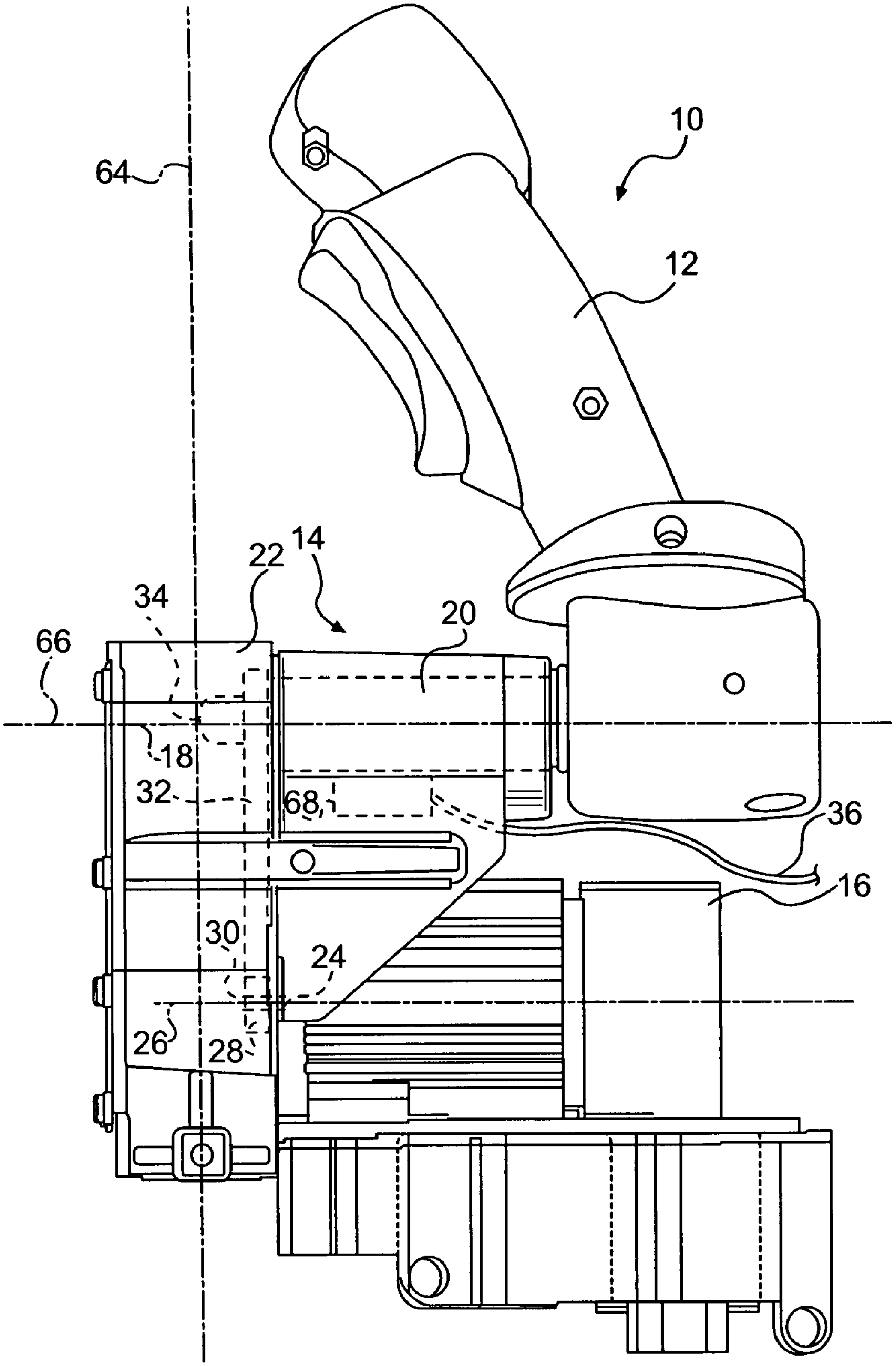
FIG. 1C is another view of the operator-control device according to the present disclosure.

FIGS. 1A-1C illustrate an operator-control device 10 according to the present disclosure. Operator-control device 10 may include a control handle 12, a support system 14 for control handle 12, and a force-feedback device 16 drivingly connected to control handle 12. Control handle 12 may have various shapes and sizes. In some embodiments, control handle 12 may be a joystick.

Support system 14 may include any component or components that support control handle 12 while allowing control handle 12 to move in one or more manners. In some embodiments, support system 14 may have a configuration that allows control handle 12 to rotate around an axis 18. For example, support system 14 may include a pivot member 20 connected to control handle 12 and engaged to a support 22 in a manner that allows pivot member 20 and control handle 12 to rotate around axis 18. In some embodiments, control handle 12 may be drivingly connected to pivot member 20 so that rotation of control handle 12 about axis 18 generates rotation of pivot member 20 about axis 18 and vice versa. For instance, control handle 12 and pivot member 20 may be formed as a unit or otherwise fixedly engaged to one another. In some embodiments, support system 14 may have a configuration that limits rotation of control handle 12 to rotation about axis 18. Axis 18 may coincide with a central axis of pivot member 20.

Force-feedback device 16 may include any component or components operable to supply an adjustable output force. For purposes of this disclosure, "force" includes torque, as well as linear force. Force-feedback device 16 may, for example, include one or more actuators and/or one or more brakes. In embodiments where force-feedback device 16 includes one or more brakes but no actuators, force-feedback device may be operable to resist motion, but not to move other components. In embodiments where force-feedback device 16 includes one or more actuators, force feedback device may be operable to resist motion, as well as move other components. Force-feedback device 16 may have a rotary-drive member 24 through which force-feedback device 16 supplies an adjustable output torque. Rotary-drive member 24 may rotate around an axis 26. In some embodiments, force-feedback device 16 may be an electric motor, and rotary-drive member 24 may be connected to, or part of, a rotor of the electric motor. Various components may support force-feedback device 16. As FIGS. 1A-1C show, in some embodiments, force-feedback device 16 may mount to support 22.

To transmit the force generated by force-feedback device 16 to control handle 12, operator-control device 10 may include any type of mechanical connection between force-feedback device 16 and control handle 12. In some embodiments, operator-control device 10 may include a gear 28 connected to an end 30 of rotary-drive member 24. Additionally, operator-control device 10 may include a gear 32 connected to an end 34 of pivot member 20 and engaged to gear 28. As a result, activating force-feedback device 16 may supply feedback force from end 30 of rotary-drive member 24 to gear 28, to gear 32, to end 34 of pivot member 20, through pivot member 20, to control handle 12. As FIGS. 1A and 1B show gear 28 may be a pinion gear, and gear 32 may be a sector gear. As one alternative to gear 32, operator-control device 10 may include a rack drivingly connected to gear 28.

In some embodiments, the connection between force-feedback device 16 and control handle 12 may have a configuration such that it converts output torque generated by force-feedback device 16 into a larger torque on control handle 12. For example, gear 32 may have a larger radius than gear 28, such that gears 28, 32 provide speed reduction and torque multiplication from force-feedback device 16 to control handle 12. This may allow supplying adequate feedback force on control handle 12 with a relatively small force-feedback device 16.

Figure 2A:
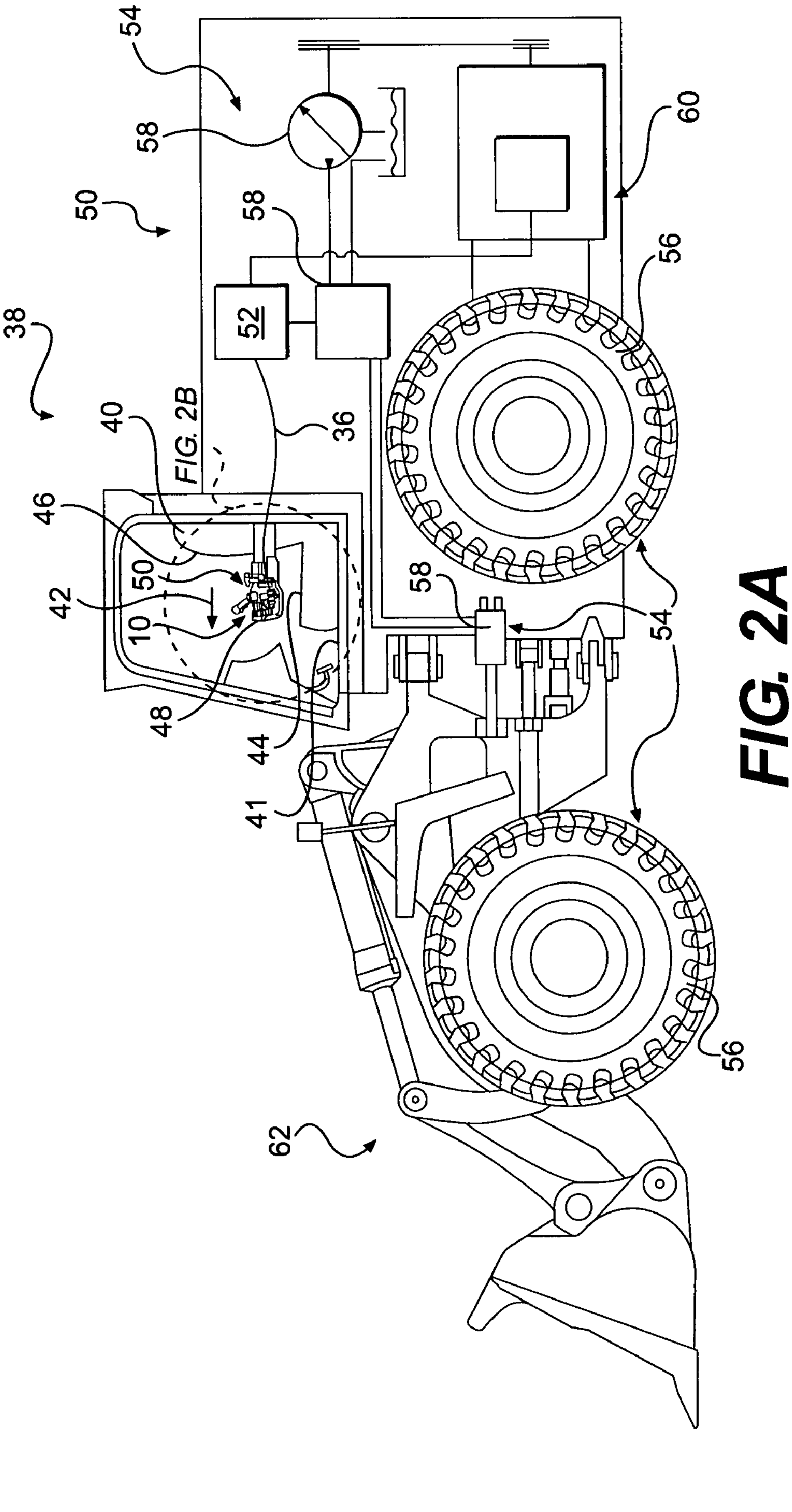
FIG. 2A illustrates one embodiment of a machine according to the present disclosure with the operator-control device shown in FIGS. 1A-1C.
Figure 2B:
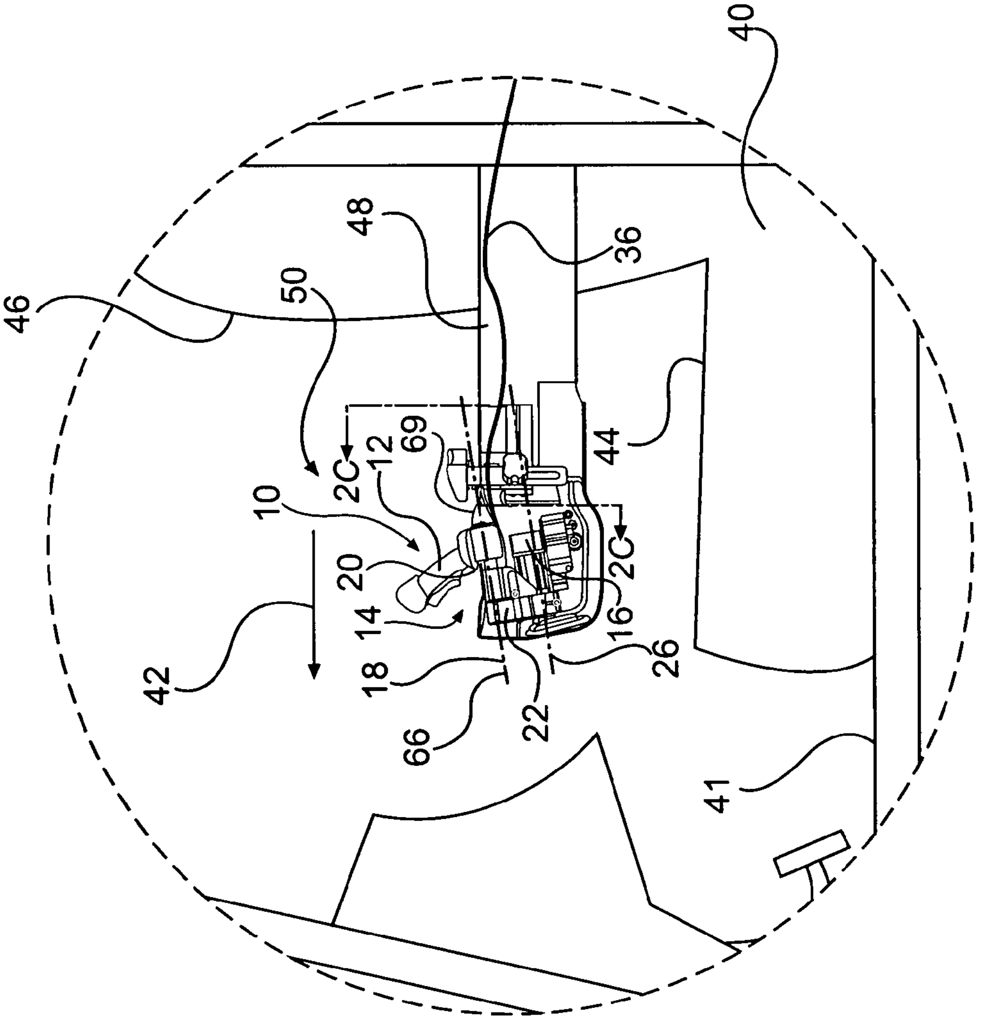
FIG. 2B is an enlarged view of the portion of FIG. 2A in circle 2B.

Force-feedback device 16 may occupy various positions and have various orientations with respect to other components of operator-control device 10. As FIG. 1C shows, in some embodiments, axis 26 be disposed below a plane 66 that extends laterally through axis 18. As FIG. 1C shows, axis 18 may extend substantially horizontally, in which case plane 66 may extend horizontally in all directions. Alternatively, as shown in FIGS. 2A and 2B and discussed below, axis 18 may extend at an angle to horizontal, in which case plane 66 may tilt in the direction of axis 18 while extending horizontally in directions perpendicular to axis 18. In some embodiments, force-feedback device 16 may sit completely below plane 66. Additionally, force-feedback device 16 and axis 26 may sit on a side of axis 18 opposite control handle 12. Furthermore, axis 26 may extend substantially parallel to axis 18. Additionally, force-feedback device 16 and pivot member 20 may be disposed on a same side of a plane 64 that extends perpendicular to axis 18 through end 34 of pivot member 20. In some embodiments, force-feedback device 16 may extend in substantially the same direction from end 30 of rotary-drive member 24 as pivot member 20 extends from its end 34.

Operator-control device 10 may also have provisions for generating one or more signals related to the motion of control handle 12. For example, operator-control device 10 may have one or more components that generate one or more signals indicating the position, velocity, and/or acceleration of control handle 12. As FIG. 1C shows, operator-control device 10 may include a sensor 68 that senses the rotary position of pivot member 20 about axis 18 and transmits an electric signal over a communication line 36 indicating the rotary position of pivot member 20 about axis 18. With pivot member 20 drivingly connected to control handle 12, such a signal may also indicate the position of control handle 12. Of course sensor 68 could also generate a signal indicating one or more parameters of the motion of control handle 12 by sensing one or more parameters of the motion of any other component drivingly connected to handle 12 or by sensing one or more parameters of the motion of handle 12 directly. Operator-control device 10 may also have various other provisions for transmitting operator inputs to other components of a machine.

Operator-control device 10 is not limited to the configuration shown in FIGS. 1A-1C and discussed above. For example, control handle 12 may have a different shape than shown in FIGS. 1A-1C. Additionally, control handle 12, pivot member 20, and force-feedback device 16 may have different positions and orientations relative to one another. Force-feedback device 16 may sit in a position other than on a side of pivot member 20 opposite control handle 12. Similarly, force-feedback device 16 may have an orientation such that axis 26 extends at an angle to axis 18. Additionally, support system 14 may have a different configuration than shown in FIGS. 1A-1C. In addition to allowing control handle 12 to rotate around axis 18, support system 14 may allow control handle 12 to move in other manners. Furthermore, control handle 12 and force-feedback device 16 may each mount to various components of a machine, rather than to a common, dedicated support 22 for control handle 12 and force-feedback device 16. Moreover, in addition to, or in place of gears 28, 32, and pivot member 20, the connection between force-feedback device 16 may include various other components, including, but not limited to, other gears, belts and pulleys, sprockets and chains, and linkages.

Figure 2C:
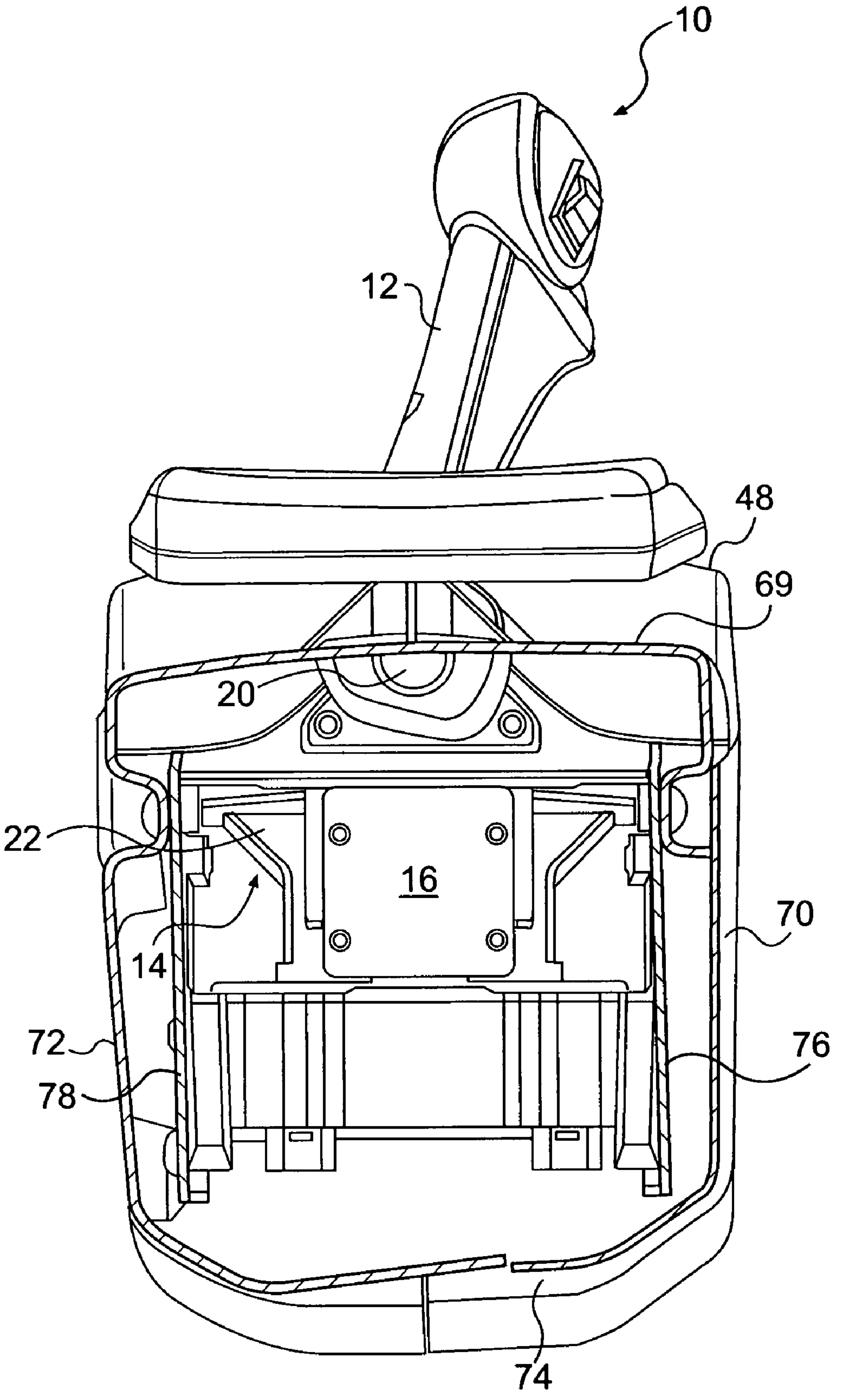
FIG. 2C is a sectional view through line 2C-2C of FIG. 2B.

FIGS. 2A-2C show one embodiment of a machine 38 that includes operator-control device 10. Machine 38 may include an operator seat 40, where an operator may sit while controlling machine 38. Operator seat 40 may face generally in a seat direction 42. Operator seat 40 may include a seat bottom 44 and a seatback 46. An armrest 48 may sit beside and above seat bottom 44. Armrest 48 may attach to seatback 46, to seat bottom 44, and/or to any other structure adjacent operator seat 40. FIGS. 2A and 2B show armrest 48 attached to seatback 46. Armrest 48 may include a upper surface 69 (FIG. 2B), a side surface 70 extending down from one side of upper surface 69, a side surface 72 extending down from an opposite side of upper surface 69, and a lower surface 74. Machine 38 may also have a floor 41 disposed adjacent operator seat 40.

Operator-control device 10 may mount adjacent operator seat 40. As FIGS. 2A-2C show, control handle 12 may extend at least partially upward from armrest 48. In some embodiments, axis 18 may extend at an angle of less than about 45 degrees to seat direction 42. Axis 18 may, for example, extend slightly downward in seat direction 42.

Operator-control device 10 may mount to machine 38 with pivot member 20 and force-feedback device 16 situated in various positions. In some embodiments, pivot member 20 may mount partially or fully underneath upper surface 69 of armrest 48. Force-feedback device 16 may be mounted above floor 41. Additionally, force-feedback device 16 may mount partially or fully underneath upper surface 69. As FIG. 2C shows, force-feedback device 16 may be disposed adjacent side surface 70. In some embodiments, force-feedback device 16 may sit between side surfaces 70, 72. Additionally, force-feedback device 16 may be disposed above lower surface 74.

In some embodiments, force-feedback device 16 may mount in a position such that the portion of axis 26 extending through force feedback device 16 is disposed below plane 66, which, as described above, extends laterally through axis 18. In some embodiments, all of force-feedback device 16 may be disposed below plane 66. Positioning force-feedback device 16 low with respect to plane 66 may help keep operator-control device 10 relatively compact above portions of axis 18 other than the point where control handle 20 extends upward. This may allow mounting operator-control device 10 with pivot member 20 and force-feedback device 16 below upper surface 69 of armrest 48 while positioning axis 18 close to upper surface 69.

Various components of machine 38 may support operator-control device 10. As FIG. 2C shows, in some embodiments, machine 38 may include brackets 76, 78 connected to opposite sides of operator-control device 10. Brackets 76, 78 may, in turn, mount to sides 70, 74 of armrest 48.

Operator-control device 10 may form part of a control system 50 of machine 38. Control system 50 may include one or more components that receive input from operator-control device 10 and one or more components that control force-feedback device 16. In some embodiments, control system 50 may include a controller 52 that receives input from operator-control device 10 and controls force-feedback device 16. Controller 52 may include one or more processors (not shown) and one or more memory devices (not shown). The input received from operator-control device 10 by controller 52 may include information relating to the position and/or motion of control handle 12. For example, controller 52 may receive a signal over communication line 36 indicating the rotary position of control handle 12 about axis 18. Controller 52 may also receive various other inputs from operator-control device 10. Additionally, operator-control device 10 may provide input to various other components of control system 50, in addition to controller 52.

Dependent on the configuration of machine 38, control system 50 may include various types of components and/or subsystems that serve various roles. In some embodiments, machine 38 may be a mobile machine, and control system 50 may include a steering system 54. Steering system 54 may have any configuration of components operable to adjust the direction of travel of machine 38. For example, steering system 54 may include controller 52, control components 58 controlled by controller 52, and steering devices 56. Steering devices 56 may include any components operable to supply steering forces to the environment surrounding machine 38, including, but not limited to, wheels (shown), track units, skis, and rudders. Control components 58 may include any components operable to adjust the magnitude and/or direction of the steering forces that steering devices 56 apply to the environment surrounding machine 38.

In addition to steering system 54, machine 38 may include various other systems. For example, machine 38 may include a propulsion system 60. Propulsion system 60 may include any configuration of components operable to propel machine 38 by applying force to the environment surrounding machine 38. Additionally, machine 38 may include an implement 62. As FIG. 2A shows, implement 62 may be a loader. Alternatively, implement 62 may be any of various other types of implements, including, but not limited to, a hoist, an excavator, a tillage tool, a broom, a hammer, a saw, a pump, and a vacuum.

Machine 38 is not limited to the configuration shown in FIGS. 2A-2C. For example, armrest 48 may omit one or more of side surface 70, side surface 72, and lower surface 74. Similarly, operator-control device 10 may receive support from various components of machine 38 other than brackets 76, 78 and armrest 48. Additionally, control system 50 may omit one or more of the components shown in FIGS. 2A-2C, and/or steering system 54 may include components not shown. For example, in addition to, or in place of, controller 52, control system 50 may have other types of control components, such as hardwired control circuits. Furthermore, machine 38 may have a different configuration of steering system 54 than shown and/or a different configuration of propulsion system 60. Similarly, machine 38 may omit one or more of steering system 54, propulsion system 60, and implement 62.

INDUSTRIAL APPLICABILITY

Operator-control device 10 and machine 38 may have application for any machine-executed task that requires operator input. During operation of machine 38, an operator sitting in operator seat 40 may manipulate control handle 12, and control system 50 may control one or more aspects of the operation of machine 38 based on the position and/or motion of control handle 12. In some embodiments, steering system 54 may control the direction of travel of machine 38 based at least in part on the position and/or motion of control handle 12. For example, steering system 54 may adjust the trajectory of machine 38 to the operator's left in response to the operator pivoting control handle 12 to the left, and steering system 54 may adjust the trajectory of machine 38 to the operator's right in response to the operator pivoting control handle 12 to the right.

While an operator manipulates control handle 12, control system 50 may control the feedback force supplied to control handle 12 by force-feedback device 16 based on various operating parameters of machine 38. For example, control system 50 may control the feedback force as a function of one or more parameters that control system 50 adjusts dependent on motion of control handle 12 and/or as a function of the motion of control handle 12. Depending on what operating parameters control system 50 controls the feedback force based on, the feedback force may indicate various things about the operation of machine 38 to the operator. Receiving information about the operation of machine 38 through a feedback force controlled as a function of one or more operating parameters may allow the operator to control machine 38 more effectively.

Additionally, the disclosed positions of control handle 20 and pivot axis 18 may allow an operator to comfortably manipulate control handle 20. Positioning control handle 20 such that it extends at least partially upward from armrest 48 may allow the operator to comfortably rest his forearm on upper surface 69 of armrest 48 while manipulating control handle 20. Additionally, positioning axis 18 close to surface 69 may allow the operator to grasp control handle 20 close to axis 18, which may limit how far the operator must move his hand linearly to move control handle 20 through any particular angle. Limiting how far the operator has to move his hand linearly, may help limit operator fatigue. With axis 18 close to upper surface 69 of armrest 48 and oriented at a small angle to seat direction 42, the operator may manipulate control handle 20 primarily by rotating his hand about the axis of his forearm. This may prove particularly comfortable for the operator.

The disclosed embodiments of operator-control device 10 may facilitate achieving the benefits of providing controlled feedback force on control handle 12 in combination with the benefits of mounting operator-control device 10 with control handle 12 extending above armrest 48. Mounting force-feedback device 16 on an axis 26 different from axis 18 that control handle 12 rotates about may enable keeping operator-control device 10 relatively compact along axis 18. This may allow mounting the portions of operator-control device 10 other than control handle 12 in compact spaces, such as inside armrest 48.

Operation of machine 38 is not limited to the examples provided above. In some embodiments, control system 50 may control a parameter of operation other than the direction of travel of machine 38 based on the motion of control handle 12. For example, in addition to, or in place of, controlling the direction of travel of machine 38 based on the motion of control handle 12, control system 50 may control one or more parameters of the operation of propulsion system 60 and/or implement 62 based on the motion of control handle 12.

It will be apparent to those skilled in the art that various modifications and variations can be made in the operator-control device and methods without departing from the scope of the disclosure. Other embodiments of the disclosed operator-control device and methods will be apparent to those skilled in the art from consideration of the specification and practice of the operator-control device and methods disclosed herein. It is intended that the specification and examples be considered as exemplary only, with a true scope of the disclosure being indicated by the following claims and their equivalents.

What is claimed is:

1. A machine, comprising:
an operator seat;
an armrest adjacent the operator seat; and
a control system, including
a control handle extending at least partially upward from the armrest, and
a force-feedback device drivingly connected to the control handle and operable to supply feedback force to the control handle, the force-feedback device including at least one of an actuator or a brake, wherein the control system automatically adjusts the magnitude of feedback force supplied to the control handle by the force-feedback device in at least some circumstances.

2. The machine of claim 1, wherein:
the control handle is rotatable around a first axis; and
the force-feedback device includes a rotary-drive member that is drivingly connected to the control handle, the rotary-drive member being rotatable around a second axis.

3. The machine of claim 2, wherein the second axis is disposed below a plane that extends laterally through the first axis.

4. The machine of claim 1, wherein:
the armrest includes a upper surface, a first side surface, and a second side surface; and
the force-feedback device is disposed between the first side surface and the second side surface.

5. The machine of claim 1, wherein the control handle is rotatable around an axis that extends at an angle of less than about 45 degrees to a direction in which the operator seat faces.

6. The machine of claim 1, wherein the force-feedback device includes an actuator.

7. The machine of claim 1, wherein the force-feedback device includes an electric motor.

8. The machine of claim 1, wherein the force-feedback device includes a rotary-drive member drivingly connected to the control handle, wherein the connection between the rotary drive member and the control handle converts an output torque supplied by the force-feedback device at the rotary-drive member into a larger torque on the control handle.

9. The machine of claim 1, wherein:
the machine is a mobile machine; and
the control system further includes a steering system that controls the direction of travel of the machine based at least in part on the position of the control handle.

10. A method of operating a machine, the machine having an operator seat, an armrest adjacent the operator seat, and a control system, the method comprising:
supporting a control handle of the control system with the control handle extending at least partially upward from the armrest;
generating an electrical signal related to one or more aspects of the motion of the control handle and supplying the electrical signal to one or more components of the control system; and
supplying feedback force to the control handle with a force-feedback device, including adjusting the magnitude of the feedback force based on one or more operating conditions of the machine.

11. The method of claim 10, wherein:
supporting the control handle includes allowing the control handle to rotate around a first axis; and
supplying the feedback force to the control handle with the force-feedback device includes operating the force-feedback device to generate an output torque with a rotary drive member of the force-feedback device, the rotary-drive member rotating about a second axis.

12. The method of claim 10, wherein:
supporting the control handle includes allowing the control handle to rotate around an axis; and
supplying feedback force to the control handle with the force-feedback device includes generating output torque with a rotary-drive member of the force feedback device and converting the output torque into a larger torque on the control handle.

13. The method of claim 10, wherein the signal indicates a position of the control handle.

14. The method of claim 10, wherein:
the machine is a mobile machine; and
the method further includes controlling the direction of travel of the mobile machine based at least in part on motion of the control handle.

15. A machine, comprising:
an operator seat;
a floor adjacent the operator seat;
an armrest adjacent the operator seat; and
a control system, including
a control handle extending at least partially upward from the armrest,
a force-feedback device disposed above the floor, the force feedback device being drivingly connected to the control handle and operable to supply feedback force to the control handle, and
wherein the control system automatically adjusts the magnitude of feedback force supplied to the control handle by the force-feedback device in at least some circumstances.

16. The machine of claim 15, wherein:
the armrest includes an upper surface; and
the force-feedback device is underneath the upper surface of the armrest.

17. The machine of claim 16, wherein:
the armrest includes a first side surface below the upper surface and a second side surface below the upper surface; and
the force-feedback device is disposed between the first side surface and the second side surface.

18. The machine of claim 15, wherein the force-feedback device is disposed at least partially inside the armrest.

19. The machine of claim 15, wherein:

the control handle is rotatable around a first axis; and the force-feedback device includes a rotary-drive member drivingly connected to the control handle, the rotary-drive member being rotatable around a second axis.

20. The machine of claim 15, wherein the control handle is rotatable around an axis disposed at an angle of less than about 45 degrees to a direction in which the seat faces.

* * * * *